(12) United States Patent
Uematsu et al.

(10) Patent No.: US 10,715,003 B2
(45) Date of Patent: Jul. 14, 2020

(54) ELECTRIC ACTUATOR

(71) Applicant: NIDEC TOSOK CORPORATION, Kanagawa (JP)

(72) Inventors: Yutaka Uematsu, Kanagawa (JP);
Shun Kato, Kanagawa (JP);
Ryunosuke Oikawa, Kanagawa (JP);
Yuzo Akasaka, Kanagawa (JP);
Kazumi Shinkai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 63 days.

(21) Appl. No.: 16/234,529

(22) Filed: Dec. 27, 2018

(65) Prior Publication Data

US 2019/0207462 A1    Jul. 4, 2019

(30) Foreign Application Priority Data

Dec. 28, 2017 (JP) ................................. 2017-253680

(51) Int. Cl.
*H02K 3/50* (2006.01)
*H02K 5/08* (2006.01)
(Continued)

(52) U.S. Cl.
CPC ............... *H02K 3/50* (2013.01); *F16H 57/02* (2013.01); *F16H 61/0006* (2013.01);
(Continued)

(58) Field of Classification Search
CPC .......... H02K 3/50; H02K 3/522; H02K 11/33; H02K 5/08; H02K 21/14; H02K 11/215;
(Continued)

(56) References Cited

U.S. PATENT DOCUMENTS 7,847,447 B2 * 12/2010 Kume .................... H02K 7/116
310/100
7,911,101 B2 * 3/2011 Kimura ................ H02K 5/1732
310/15
(Continued)

FOREIGN PATENT DOCUMENTS

| JP | 2009065742 | 3/2009 |
| JP | 2015200347 | 11/2015 |
| JP | 2016100910 | 5/2016 |

*Primary Examiner* — John K Kim
(74) *Attorney, Agent, or Firm* — JCIPRNET

(57) ABSTRACT

An electric actuator includes: a motor unit; a speed reducer; a circuit board; a busbar; and a housing. The housing has a motor case and a circuit board case attached to one side of the motor case in an axial direction. The circuit board case has a bottom wall blocking an opening of the motor case. The bottom wall has a bottom wall through-hole that penetrates through the bottom wall in the axial direction on an outer side beyond the speed reducer in the radial direction. A busbar has a busbar main body section, a coil line connecting section to which a coil line extending on one side in the axial direction from a coil is connected, and a connection terminal section. The connection terminal section extends to one side of the bottom wall in the axial direction via the bottom wall through-hole and is connected to the circuit board.

10 Claims, 6 Drawing Sheets

(51) Int. Cl.

| | | |
|---|---|---|
| *H02K 21/14* | (2006.01) | |
| *H02K 11/215* | (2016.01) | |
| *H02K 7/116* | (2006.01) | |
| *H02K 7/08* | (2006.01) | |
| *H02K 5/22* | (2006.01) | |
| *H02K 5/173* | (2006.01) | |
| *F16H 57/02* | (2012.01) | |
| *F16H 61/00* | (2006.01) | |
| *F16H 61/32* | (2006.01) | |
| *F16H 19/00* | (2006.01) | |
| *H02K 11/33* | (2016.01) | |
| *H02K 3/52* | (2006.01) | |
| *F16H 1/32* | (2006.01) | |

(52) U.S. Cl.
CPC ............ *F16H 61/32* (2013.01); *H02K 3/522* (2013.01); *H02K 5/08* (2013.01); *H02K 5/1732* (2013.01); *H02K 5/225* (2013.01); *H02K 7/083* (2013.01); *H02K 7/116* (2013.01); *H02K 11/215* (2016.01); *H02K 11/33* (2016.01); *H02K 21/14* (2013.01); *F16H 1/32* (2013.01); *F16H 19/001* (2013.01); *F16H 2001/325* (2013.01); *F16H 2057/02034* (2013.01); *H02K 2203/09* (2013.01); *H02K 2211/03* (2013.01)

(58) Field of Classification Search
CPC ........ H02K 7/116; H02K 7/083; H02K 5/225; H02K 5/1732; H02K 2203/09; H02K 2211/03; F16H 57/02; F16H 61/0006; F16H 61/32; F16H 19/001; F16H 2001/325; F16H 1/32; F16H 2057/02034
USPC .............................................. 310/71, 89, 91
See application file for complete search history.

(56) References Cited

U.S. PATENT DOCUMENTS

| | | | | |
|---|---|---|---|---|
| 8,816,551 | B2* | 8/2014 | Oishi ..................... | H02K 5/225 29/596 |
| 2004/0007935 | A1* | 1/2004 | Kimura .................. | H02K 3/522 310/71 |
| 2007/0145839 | A1* | 6/2007 | Kimura ................ | H02K 19/103 310/68 B |
| 2011/0168472 | A1* | 7/2011 | Li .......................... | B60L 50/52 180/206.4 |
| 2016/0156246 | A1* | 6/2016 | Hotori .................... | H02K 5/225 310/43 |
| 2019/0207462 | A1* | 7/2019 | Uematsu .............. | H02K 11/215 |

* cited by examiner

ELECTRIC ACTUATOR

CROSS REFERENCE TO RELATED APPLICATIONS

The application claims priority under 35 U.S.C. § 119 to Japanese Patent Application No. 2017-253680 filed on Dec. 28, 2017, and the entire content of which is incorporated herein by reference and made a part of this specification.

BACKGROUND

Technical Field

The disclosure relates to an electric actuator.

Description of Related Art

An electric actuator including a motor unit, a speed reducer that is coupled to the motor unit, and an output section to which rotation of the motor unit is delivered via the speed reducer is known and is mounted on an automatic transmission that shifts engine output for traveling of a vehicle.

In the electric actuator described above, arranging the speed reducer between a stator of the motor unit and a circuit board that is electrically connected to the stator in an axial direction is considered. However, in this case, there is a problem that it is difficult to connect the stator to the circuit board.

In view of the aforementioned circumstances, the disclosure provides an electric actuator in which a speed reducer is arranged between a stator and a circuit board in an axial direction, and it is easy to connect the stator to the circuit board.

SUMMARY

According to an aspect of the disclosure, an electric actuator includes: a motor unit that has a motor shaft extending in an axial direction and a stator arranged on an outer side of the motor shaft in a radial direction; a speed reducer that is arranged on one side of the stator in the axial direction and is coupled to one side of the motor shaft in the axial direction; a circuit board that is arranged on one side of the speed reducer in the axial direction; a busbar that electrically connects the stator to the circuit board; an output section that has an output shaft to which rotation of the motor shaft is delivered via the speed reducer; and a housing that accommodates the motor unit, the speed reducer, the circuit board, the busbar, and the output section. The housing has a motor case that opens on one side in the axial direction and a circuit board case that is attached to one side of the motor case in the axial direction. The circuit board case has a bottom wall that blocks the opening of the motor case and accommodates the circuit board on one side beyond the bottom wall in the axial direction. The bottom wall has a bottom wall through-hole that penetrates through the bottom wall in the axial direction on an outer side beyond the speed reducer in the radial direction. The stator has a plurality of coils. The busbar has a busbar main body section that is arranged between the speed reducer and the stator in the axial direction and extends along a plane that is parallel to the axial direction, a coil line connecting section, which continues to the busbar main body section, to which a coil line extending on one side in the axial direction from the coil is connected, and a connection terminal section that extends on one side in the axial direction from the busbar main body section on an outer side beyond the speed reducer in the radial direction. The connection terminal section extends on one side in the axial direction from the other side of the bottom wall in the axial direction via the bottom wall through-hole and is connected to the circuit board.

According to an aspect of the disclosure, the electric actuator, in which the speed reducer is arranged between the stator and the circuit board in the axial direction, with a structure in which the stator and the circuit board are easily connected, is provided.

The above and other elements, features, steps, characteristics and advantages of the disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

In the respective drawings, a Z-axis direction is an u direction upward/downward direction in which the positive side is an upper side and the negative side is a lower side. An axial direction of a central axis J1 that is a virtual axis that is appropriately represented in the respective drawings is parallel to the Z-axis direction, that is, the upward/downward direction. In the following description, the direction that is parallel to the axial direction of the central axis J1 will simply be referred to as an "axial direction Z". Also, a radial direction about the central axis J1 will simply be referred to as a "radial direction" while a circumferential direction about the central axis J1 will simply be referred to as a "circumferential direction" unless particularly stated otherwise. In the embodiment, the upper side corresponds to one side in the axial direction while the lower side corresponds to the other side in the axial direction. Note that the upper side and the lower side are names for simply describing a relative positional relationship, and an actual arrangement relationship or the like may be an arrangement relationship or the like other than the arrangement relationship or the like represented by these names.

Figure 1:
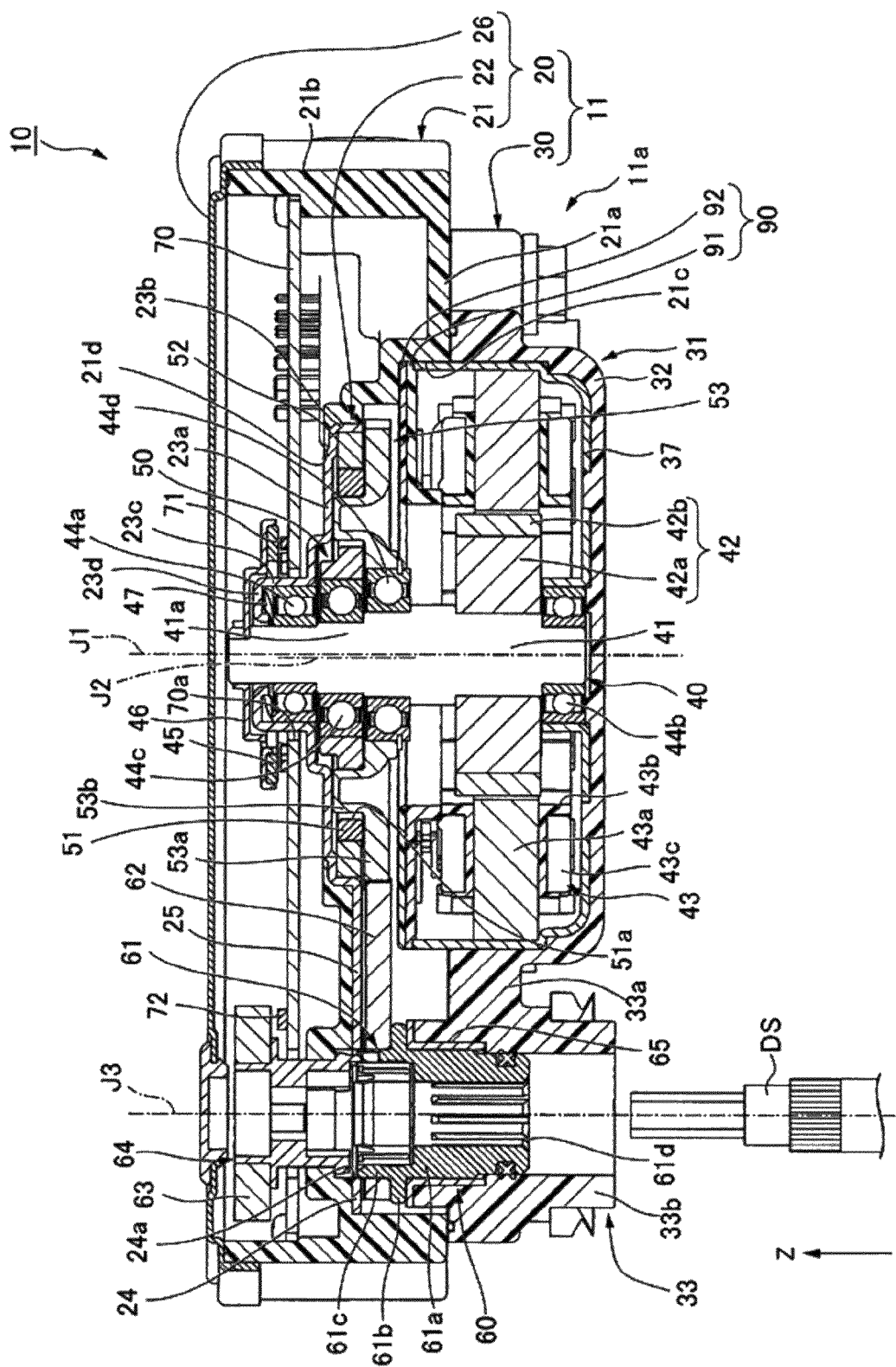
FIG. 1 is a sectional view illustrating an electric actuator according to an embodiment.
Figure 2:
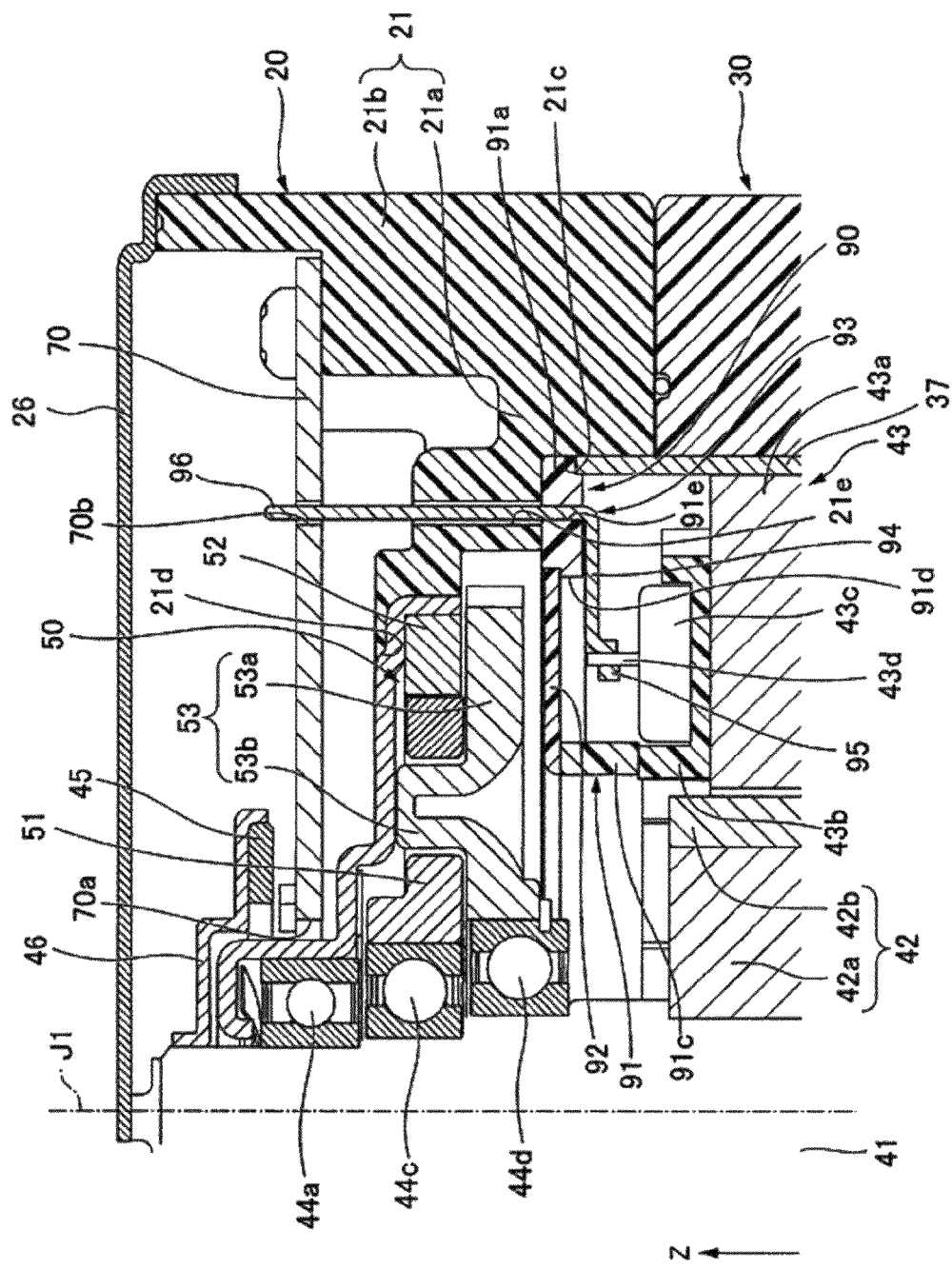
FIG. 2 is a sectional view illustrating a portion of the electric actuator according to the embodiment.

An electric actuator according to the embodiment illustrated in FIGS. 1 and 2 is attached to a vehicle. More specifically, the electric actuator 10 is mounted on an actuator device of a shift-by-wire scheme that is driven on the basis of shift operations of a driver of the vehicle. As illustrated in FIGS. 1 and 2, the electric actuator 10 includes a motor unit 40, a speed reducer 50, an output section 60, a circuit board 70, motor unit sensors 71, output section sensors 72, a housing 11, a busbar holder 90, and busbars 93.

As illustrated in FIG. 1, the motor unit 40 has a motor shaft 41, a first bearing 44a, a second bearing 44b, a third bearing 44c, a fourth bearing 44d, a rotor main body 42, a stator 43, a sensor magnet 45 for the motor unit, and a magnet holder 46.

The motor shaft 41 extends in the axial direction Z. The first bearing 44a, the second bearing 44b, the third bearing 44c, and the fourth bearing 44d support the motor shaft 41 such that the motor shaft 41 can rotate about the central axis J1. In the embodiment, the first bearing 44a, the second bearing 44b, the third bearing 44c, and the fourth bearing 44d are ball bearings, for example.

An eccentric shaft section 41a that is a portion, which is supported by the third bearing 44c, of the motor shaft 41 has a cylindrical shape that extends about an eccentric shaft J2 that is parallel to the central axis J1 and is eccentric to the central axis J1. A portion other than the eccentric shaft section 41a of the motor shaft 41 has a cylindrical shape that extends about the central axis J1.

The rotor main body 42 is fixed to the motor shaft 41. More specifically, the rotor main body 42 is fixed to a lower portion of the motor shaft 41. The rotor main body 42 has a rotor core 42a and a rotor magnet 42b. The rotor core 42a is fixed to an outer circumferential surface of a lower portion of the motor shaft 41 beyond the eccentric shaft section 41a. The rotor magnet 42b is fixed to an outer circumferential surface of the rotor core 42a.

The stator 43 is arranged on the outer side of the rotor main body 42 in the radial direction via a gap. That is, the stator 43 is arranged on the outer side of the motor shaft 41 in the radial direction. The stator 43 has a ring shape that surrounds the outer side of the rotor main body 42 in the radial direction. The stator 43 has a stator core 43a, an insulator 43b, and a plurality of coils 43c. The coils 43c are attached to the stator core 43a via the insulator 43b. The coils 43c are formed by a coil line being wound around teeth of the stator core 43a. As illustrated in FIG. 2, an end of the coil line that forms the coil 43c extends upward from the coils 43c. The coil line extending upward from the coils 43c will be referred to as a coil line 43d.

The magnet holder 46 has an annular shape about the central axis J1. The magnet holder 46 is fixed to an outer circumferential surface at the upper end of the motor shaft 41. The sensor magnet 45 for the motor unit has an annular plate shape about the central axis J1. A plate surface of the sensor magnet 45 for the motor unit is perpendicular to the axial direction Z. The sensor magnet 45 for the motor unit is fixed to an outer circumferential edge of the lower surface of the magnet holder 46 in the radial direction. In this manner, the sensor magnet 45 for the motor unit is attached to the motor shaft 41 via the magnet holder 46. In the embodiment, the sensor magnet 45 for the motor unit is attached to a portion, which protrudes on the upper side than the circuit board 70, of the motor shaft 41 and faces the upper surface of the circuit board 70 via a gap.

As illustrated in FIG. 1, the speed reducer 50 is coupled to the upper side of the motor shaft 41. The speed reducer 50 is arranged on the upper side of the rotor main body 42 and the stator 43. The speed reducer 50 has an external gear 51, an internal gear 52, and an output gear 53.

Although not illustrated in the drawing, the external gear 51 has an annular plate shape that extends in the radial direction of the eccentric shaft J2 about the eccentric shaft J2 of the eccentric shaft section 41a. A gear section is provided on an outer surface in the radial direction of the external gear 51. The external gear 51 is connected to the motor shaft 41 via the third bearing 44c. In this manner, the speed reducer 50 is coupled to the motor shaft 41. The external gear 51 is fitted into an outer wheel of the third bearing 44c from the outer side in the radial direction. In this manner, the third baring 44c relatively rotatably couples the motor shaft 41 and the external gear 51 about the eccentric shaft J2.

The external gear 51 has a plurality of holes 51a that allow the external gear 51 to penetrate therethrough in the axial direction Z. Although not illustrated in the drawing, the plurality of holes 51a are arranged at equal intervals all around the circumferential direction about the eccentric shaft J2. The shape of each hole 51a in the axial direction Z is a circular shape.

The internal gear 52 is fixed to the circuit board case 2 around the outer side in the radial direction of the external gear 51 and is meshed with the external gear 51. The internal gear 52 is held by a metal member of the housing 11, which will be described later. The internal gear 52 has an annular shape about the central axis J1. A gear section is provided at the inner circumferential surface of the internal gear 52. The gear section of the internal gear 52 is meshed with the gear section of the external gear 51.

The output gear 53 has an output gear main body 53a and a plurality of pins 53b. The output gear main body 53a is arranged on the lower side of the external gear 51 and the internal gear 52. The output gear main body 53a has an annular plate shape that extends in the radial direction about the central axis J1. A gear section is provided at an outer surface in the radial direction of the output gear main body 53a. The output gear main body 53a is connected to the motor shaft 41 via the fourth bearing 44d.

The plurality of pins 53b have cylindrical shapes that protrude upward from the upper surface of the output gear main body 53a. Although not illustrated in the drawing, the plurality of pins 53b are arranged at equal intervals all around the circumferential direction. The outer diameter of the pins 53b is smaller than the inner diameter of each hole 51a. The plurality of pins 53b are caused to pass through the plurality of respective holes 51a from the lower side. The outer circumferential surfaces of the pins 53b are inscribed in the inner circumferential surfaces of the holes 51a. The inner circumferential surfaces of the holes 51a support the external gear 51 via the pins 53b such that the external gear 51 can slide about the central axis J1.

The output section 60 is a portion that outputs drive force to the electric actuator 10. The output section 60 is arranged on the outer side in the radial direction of the motor unit 40. The output section 60 has an output shaft 61, a driving gear 62, a sensor magnet 63 for the output section, and a magnet holder 64.

The output shaft 61 has a tubular shape that extends in the axial direction Z of the motor shaft 41. In this manner, since the output shaft 61 extends in the same direction as that of the motor shaft 41, it is possible to simplify the structure of the speed reducer 50 that delivers rotation of the motor shaft 41 to the output shaft 61. In the embodiment, the output shaft 61 has a cylindrical shape about an output central axis J3 that is a virtual axis. The output central axis J3 is arranged such that the output central axis J3 is parallel to the central axis J1 and is away from the central axis J1 in the radial direction. That is, the motor shaft 41 and the output shaft 61 are arranged away from each other in the radial direction of the motor shaft 41.

The output shaft 61 has openings 61d that open on the lower side. In the embodiment, the output shaft 61 opens on both sides in the axial direction. The output shaft 61 has a spline groove at a lower portion of an inner circumferential surface. The output shaft 61 has a cylindrical output shaft main body 61a and a flange section 61b that protrudes outward in the radial direction of the output central axis J3 from the output shaft main body 61a. The output shaft 61 is arranged at a position at which the output shaft 61 overlaps with the rotor main body 42 in the radial direction of the motor shaft 41. A lower end of the output shaft 61, that is, the opening 61d, is arranged above the lower end of the motor unit 40. In the embodiment, the lower end of the motor unit 40 is a lower end of the motor shaft 41.

A driven shaft DS is inserted into and coupled to the output shaft 61 via the opening 61d from the lower side. More specifically, the output shaft 61 and the driven shaft DS are coupled to each other by the spline portion provided at the outer circumferential surface of the driven shaft DS being fitted into the spline groove provided at the inner circumferential surface of the output shaft 61. Drive force of the electric actuator 10 is delivered to the driven shaft DS via the output shaft 61. In this manner, the electric actuator 10 causes the driven shaft DS to rotate about the output central axis J3.

As described above, the side on which the opening 61d with the driven shaft DS inserted thereinto opens is the same side as the side on which the motor unit 40 is arranged relative to the speed reducer 50. Therefore, the motor unit 40 can be arranged on the side of an attachment target body to which the electric actuator 10 is attached. In this manner, it is possible to utilize a space outside the driven shaft DS as a space in which the motor unit 40 is arranged in the radial direction of the driven shaft DS. Therefore, it is possible to attach the electric actuator 10 to the attachment target body more closely. Therefore, the electric actuator 10 capable of reducing the attachment height when attached to the attachment target body is obtained according to the embodiment. The attachment target body in the embodiment is a vehicle.

In addition, according to the embodiment, the orientation in which the motor shaft 41 extends from the motor unit 40 toward the speed reducer 50 is an upward orientation, which is opposite to the orientation in which the opening 61d of the output shaft 61 opens. Therefore, it is possible to set the orientation in which the output shaft 61 extends from the speed reducer 50 to be opposite to the orientation in which the motor shaft 41 extends from the motor unit 40 toward the speed reducer 50. In this manner, it is possible to arrange the motor shaft 41 and the output shaft 61 such that the motor shaft 41 and the output shaft 61 overlap with each other in the radial direction of the motor shaft 51 and to reduce the size of the electric actuator 10 in the axial direction Z. Also, since the output shaft 61 overlaps with the rotor main body 42 in the radial direction of the motor shaft 41, it is possible to further reduce the size of the electric actuator 10 in the axial direction Z. In this manner, it becomes easier to reduce the attachment height of the electric actuator 10 when attached to the attachment target body.

Also, according to the embodiment, the lower end of the motor unit 40 is arranged below the opening 61d. Therefore, it is possible to arrange the motor unit 40 at a closer position to the attachment target body. In this manner, it becomes easier to further reduce the attachment height of the electric actuator 10 when attached to the attachment target body.

The driving gear 62 is fixed to the output shaft 61 and is meshed with the output gear 53. In the embodiment, the driving gear 62 is fixed to a portion, which is upper than the flange section 61b, of the outer circumferential surface of the output shaft main body 61a. The driving gear 62 is brought into contact with the upper surface of the flange section 61b. Although not illustrated in the drawing, the driving gear 62 is a fan-shaped gear that extends from the output shaft 61 toward the output gear 53 and has a width increasing toward the output gear 53. A gear section is provided at an end of the driving gear 62 on the side of the output gear 53. The gear section of the driving gear 62 is meshed with the gear section of the output gear 53.

The magnet holder 64 is a substantially cylindrical member that extends in the axial direction Z about the output central axis J3. The magnet holder 64 opens on both sides in the axial direction. The magnet holder 64 is arranged on the upper side of the output shaft 61 and on the outer side in the radial direction of the speed reducer 50. The magnet holder 64 penetrates through the circuit board 70 in the axial direction Z. The inner portion of the magnet holder 64 is coupled to the inner portion of the output shaft 61. An upper end of the driven shaft DS inserted into the output shaft 61 is press-fitted into the magnet holder 64. In this manner, the magnet holder 64 is fixed to the driven shaft DS.

The sensor magnet 63 for the output section has an annular shape about the output central axis J3. The sensor magnet 63 for the output section is fixed to the outer circumferential surface at the upper end of the magnet holder 64. The sensor magnet 63 for the output section is fixed to the driven shaft DS via the magnet holder 64 by the magnet holder 64 being fixed to the driven shaft DS. The sensor magnet 63 for the output section faces the upper face of the circuit board 70 via a gap.

If the motor shaft 41 is caused to rotate about the central axis J1, the eccentric shaft section 41a revolves in the circumferential direction about the central axis J1. The revolution of the eccentric shaft section 41a is delivered to the external gear 51 via the third bearing 44c, and the external gear 51 slides while the position at which the outer circumferential surfaces of the pins are inscribed in the inner circumferential surfaces of the holes 51a change. In this manner, the position at which the gear section of the external gear 51 and the gear section of the internal gear 52 are meshed with each other changes in the circumferential direction. Therefore, rotation force of the motor shaft 41 is delivered to the internal gear 52 via the external gear 51.

Here, the internal gear 52 does not rotate since the internal gear 52 is fixed in the embodiment. Therefore, the external gear 51 rotates about the eccentric shaft J2 using counterforce of the rotation force delivered to the internal gear 52. At this time, the orientation in which the external gear 51 rotates is opposite to the orientation in which the motor shaft 41 rotates. The rotation of the external gear 51 about the eccentric shaft J2 is delivered to the output gear 53 via the holes 51a and the pins 53b. In this manner, the output gear 53 rotates about the central axis J1. The rotation of the motor shaft 41 is decelerated and is then delivered to the output gear 53.

If the output gear 53 rotates, the driving gear 62 meshed with the output gear 53 rotates about the output central axis J3. In this manner, the output shaft 61 fixed to the driving gear 62 rotates about the output central axis J3. In this manner, the rotation of the motor shaft 41 is delivered to the output shaft 61 via the speed reducer 50.

The circuit board 70 is arranged above the rotor main body 42. The circuit board 70 is arranged on the upper side of the speed reducer 50. The circuit board 70 has a plate surface with a plate shape that is perpendicular to the axial direction Z. The circuit board 70 has a through-hole 70a that penetrates through the circuit board 70 in the axial direction Z. The motor shaft 41 is caused to pass through the through-hole 70a. In this manner, the motor shaft 41 penetrates through the circuit board 70 in the axial direction Z. The circuit board 70 is electrically connected to the stator 43 via a busbar, which is not illustrated in the drawing. That is, the circuit board 70 is electrically connected to the motor unit 40.

As illustrated in FIG. 2, the circuit board 70 has circuit board through-holes 70b that penetrate through the circuit board 70 in the axial direction Z. The busbars 93 are caused to pass through the circuit board through-holes 70b. Although not illustrated in the drawing, the circuit board through-holes 70b have a rectangular shape, for example, when seen in the axial direction Z. A plurality of circuit board through-holes 70b are provided.

As illustrated in FIG. 1, the motor unit sensors 71 are fixed to the upper surface of the circuit board 70. More specifically, the motor unit sensors 71 are fixed to a portion, which faces the sensor magnet 45 for the motor unit in the axial direction Z via a gap, of the upper plane of the circuit board 70. The motor unit sensors 71 are magnetic sensors that detect a magnet field of the sensor magnet 45 for the motor unit. The motor unit sensors 71 are hall elements, for example. Although not illustrated in the drawing, three motor unit sensor s 71 are provided in the circumferential direction, for example. The motor unit sensors 71 detect the rotation position of the sensor magnet 45 for the motor unit by detecting the magnetic field of the sensor magnet 45 for the motor unit, thereby detecting the rotation of the motor shaft 41.

In the embodiment, the speed reducer 50 is coupled to the upper side of the motor shaft 41, and the circuit board 70 is arranged above the rotor main body 42 and on the upper side of the speed reducer 50. Therefore, the speed reducer 50 is arranged between the circuit board 70 and the rotor main body 42 in the axial direction Z. In this manner, it is possible to arrange the motor unit sensors 71 fixed to the circuit board 70 away from the rotor main body 42 and the stator 43. Therefore, it is possible to reduce influences of the magnetic field generated by the rotor main body 42 and the stator 43 and acting on the motor unit sensor 71 and to improve detection precision of the motor unit sensors 71.

The output section sensors 72 are fixed to the upper surface of the circuit board 70. More specifically, the output section sensors 72 are fixed to a portion, which faces the sensor magnet 63 for the output section in the axial direction Z via a gap, of the upper surface of the circuit board 70. The output section sensors 72 are magnetic sensors that detect the magnetic field of the sensor magnet 63 for the output section. The output section sensors 72 are hall elements, for example. Although not illustrated in the drawing, three output section sensors 72 are provided in the circumferential direction about the output central axis J3, for example. The output section sensors 72 detect the rotation position of the sensor magnet 63 for the output section by detecting the magnetic field of the sensor magnet 63 for the output section, thereby detecting the rotation of the driven shaft DS.

According to the embodiment, it is possible to arrange the driving gear 62 that delivers rotation drive force to the output gear 53 at a position closer to the sensor magnet 63 for the output section with the configuration in which the speed reducer 50 is arranged on the side of circuit board 70 beyond the motor unit 40. Therefore, it is possible to reduce the distance from the portion, to which the rotation drive force is delivered, of the output gear 53 to a portion to which the sensor magnet 63 for the output section is fixed in the axial direction Z and to prevent the driven shaft DS from deviating from the axis at the portion to which the sensor magnet 63 for the output section is fixed. In this manner, it is possible to improve detection accuracy of the rotation of the driven shaft DS using the output section sensors 72.

The housing 11 accommodates the motor unit 40, the speed reducer 50, the output section 60, the circuit board 70, the motor unit sensors 71, the output section sensors 72, the busbar holder 90, and the busbars 93. The housing 11 has a motor case 30 and a circuit board case 20. The motor case 30 opens on the upper side. The motor case 30 has a motor case main body 31 and a stator fixing member 37. The circuit board case 20 has a substantially rectangular parallelepiped box. The circuit board case 20 is attached to the upper side of the motor case 30 and blocks the opening of the motor case 30. The circuit board case 20 accommodates the circuit board 70. The circuit board case 20 has a circuit board case main body 21, a metal member 22, and a circuit board case cover 26.

The circuit board case main body 21 and the motor case main body 31 are made of resin. In the embodiment, the housing main body 11a is formed with the circuit board case main body 21 and the motor case main body 31. That is, the housing 11 has the housing main body 11a made of resin.

The circuit board case main body 21 has a box shape that opens on the upper side. The circuit board case main body 21 has a bottom wall 21a and a side wall 21b. That is, the circuit board case 20 has a bottom wall 21a and a side wall 21b. The bottom wall 21a extends along a plane that is perpendicular to the axial direction Z. The bottom wall 21a extends on the outer side beyond the motor case main body 31 in the radial direction when seen in the axial direction Z. The bottom wall 21a blocks the upper opening of the motor case 30. The bottom wall 21a covers the upper side of the stator 43.

The bottom wall 21a has a concave section 21c that is recessed upward from the lower surface of the bottom wall 21a. The bottom wall 21a has a central through-hole 21d that penetrates through the bottom wall 21a in the axial direction Z. The central through-hole 21d penetrates through the bottom wall 21a from the bottom surface of the concave section 21c to the upper surface of the bottom wall 21a. The central through-hole 21d has a circular shape about the central axis J1 when seen in the axial direction Z. The motor shaft 41 is caused to pass through the central through-hole 21d.

Figure 3:
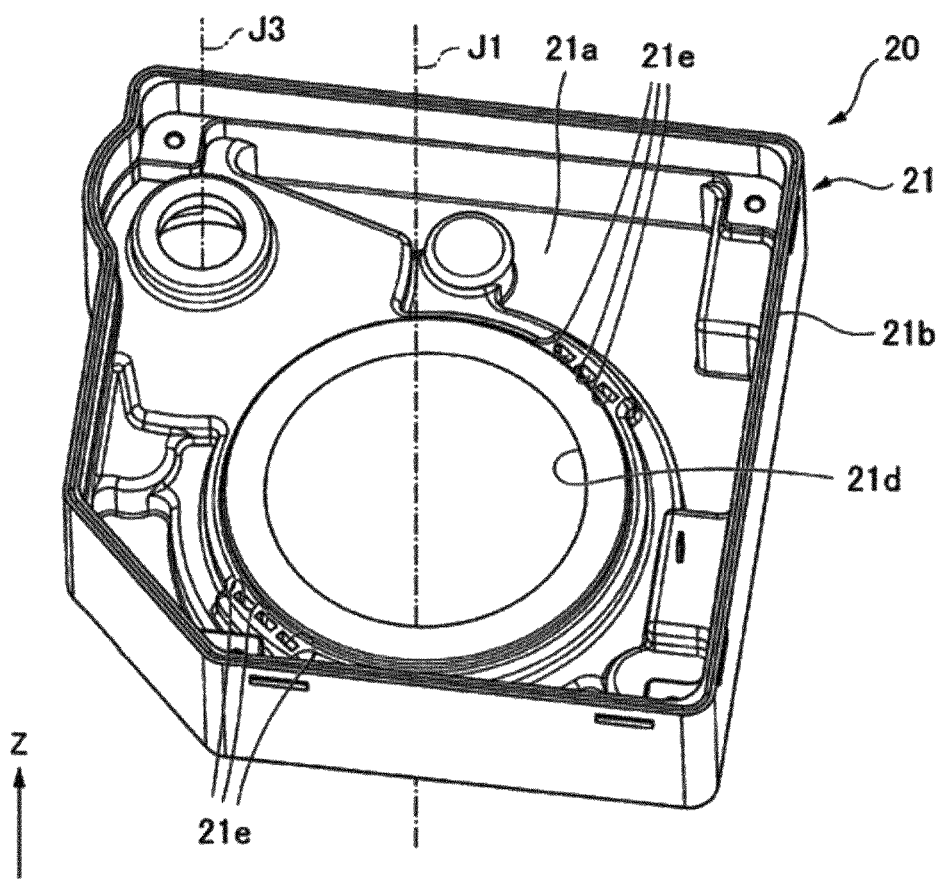
FIG. 3 is a perspective view illustrating a circuit board case main body according to the embodiment.

As illustrated in FIG. 2, the bottom wall 21a has bottom wall through-holes 21e that penetrate through the bottom wall 21a in the axial direction Z on the outer side beyond the speed reducer 50 in the radial direction. The bottom wall through-holes 21e are arranged on the outer side beyond the central through-hole 21d in the radial direction. The bottom wall through-holes 21e are arranged on the outer side of the internal gear 52 and the output gear 53 in the radial direction. As illustrated in FIG. 3, the bottom wall through-holes 21e have a rectangular shape that is long in the circumferential direction when seen in the axial direction Z. A plurality of bottom wall through-holes 21e are provided. As for the bottom through-holes 21e in the embodiment, two through-hole groups, in each of which three bottom wall through-holes 21e are aligned in the circumferential direction, are provided with the central axis J1 interposed therebetween in the radial direction. That is, a total of six bottom wall through-holes 21e are provided.

The side wall 21b has a rectangular tubular shape that protrudes upward from the outer edge of the bottom wall 21a. As illustrated in FIG. 1, the circuit board 70 is accommodated inside the side wall 21b. That is, the circuit board case 20 accommodates the circuit board 70 above the bottom wall 21a. The side wall 21b opens on the upper side. The upper opening of the side wall 21b, that is, the upper opening of the circuit board case 20 is blocked with the circuit board case cover 26. The circuit board case cover 26 is made of metal, for example.

The metal member 22 is made of metal. The metal member 22 is held by the circuit board case body 21. That is, the metal member 22 is held by the housing main body 11a. The metal member 22 is accommodated in and held at the concave section 21c. A part of the metal member 22 is embedded in the housing main body 11a in the embodiment. Therefore, it is possible to create a portion or entirety of the housing main body 11a using insert molding in which the metal member 22 is inserted into a mold and resin is poured into the mold. Therefore, it is easy to create the housing 11. In the embodiment, the circuit board case main body 21 in the housing main body 11a is created by the insert molding in which the metal member 22 is inserted into a mold and resin is poured into the mold.

Figure 4:
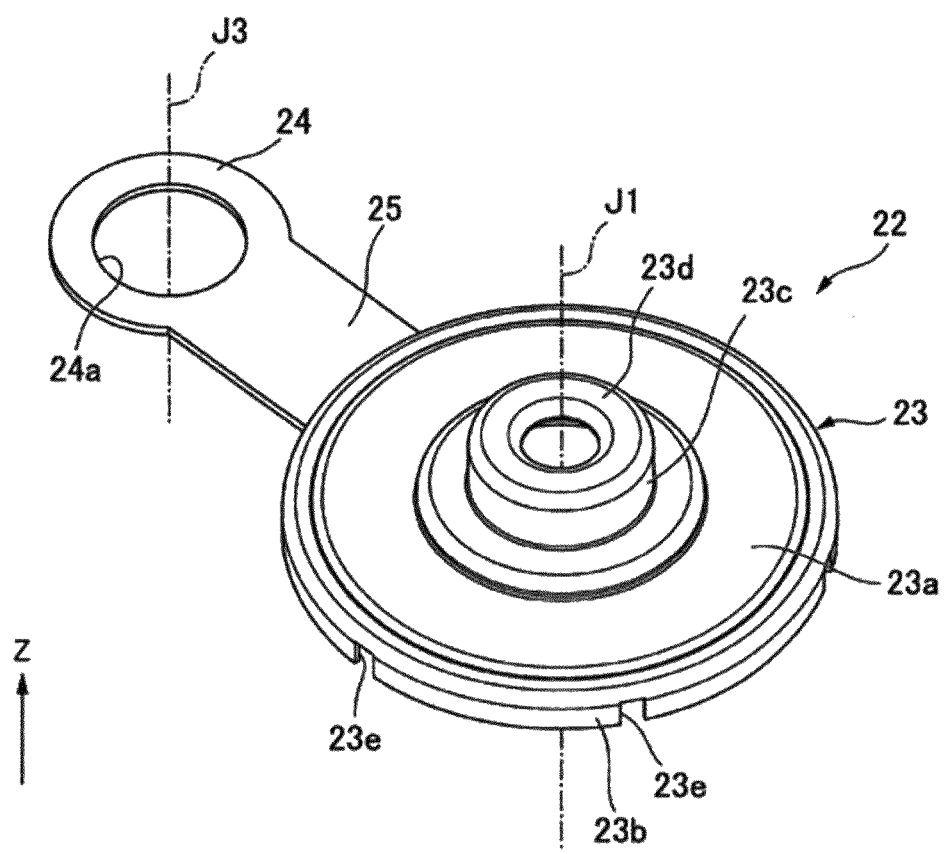
FIG. 4 is a perspective view illustrating a metal member according to the embodiment.

As illustrated in FIG. 4, the metal member 22 has a bearing holding section 23, an arm section 25, and an output shaft support section 24. The bearing holding section 23 has an annular plate section 23a, an outer cylindrical section 23b, an inner cylindrical section 23c, and a top plate section 23d. The annular plate section 23a has an annular plate shape about the central axis J1. The plate surface of the annular plate section 23a is perpendicular to the axial direction Z.

The outer cylindrical section 23b has a tubular shape that protrudes downward from the outer circumferential edge of the annular plate section 23a. The outer cylindrical section 23b has a plurality of slits 23e that penetrate through the wall portion of the outer cylindrical section 23b in the radial direction. The plurality of slits 23e are arranged at equal intervals all around the circumferential direction. The slits 23e open to the lower side.

As illustrated in FIG. 1, the internal gear 52 is held on the inner side in the radial direction of the outer cylindrical section 23b. In this manner, the speed reducer 50 is held at the lower surface of the bottom wall 21a via the metal member 22. Although not illustrated in the drawing, a plurality of protruding sections that protrude outward in the radial direction are provided at the outer circumferential surface of the internal gear 52, and the protruding portions are inserted into the respective slits 23e. In this manner, the protruding sections are hooked at the inner surfaces of the slits 23e, and it is possible to prevent the internal gear 52 from moving in the circumferential direction relative to the metal member 22. The outer cylindrical section 23b is embedded on the inner side of the central through-holes 21d in the radial direction and held therein.

The inner cylindrical section 23c has a cylindrical shape that protrudes upward from the inner circumferential edge of the annular plate section 23a. The first bearing 44a is held on the inner side in the radial direction of the inner cylindrical section 23c. In this manner, the bearing holding section 23 holds the first bearing 44a. The inner cylindrical section 23c protrudes above the bottom wall 21a. The inner cylindrical section 23c is arranged on the inner side in the radial direction of the side wall 21b. The inner cylindrical section 23c penetrates through the circuit board 70 in the axial direction via the through-hole 70a and protrudes above the circuit board 70.

In this manner, at least a portion of the first bearing 44a that is held at the inner cylindrical section 23c is inserted into the through-hole 70a. Therefore, it is possible to support the motor shaft 41 at a position that is close to a portion, to which the sensor magnet 45 for the motor unit is attached, of the motor shaft 41 by the first bearing 44a. In this manner, it is possible to prevent the axis of the portion, to which the sensor magnet 45 for the motor unit is attached, of the motor shaft 41 from deviating and to prevent the position of the sensor magnet 45 for the motor unit from deviating. Therefore, it is possible to prevent detection accuracy of the rotation of the motor shaft 41 using the motor unit sensors 71 from being degraded. Also, since it is possible to arrange the first bearing 44a and the circuit board 70 such that the first bearing 44a and the circuit board 70 overlap with each other when seen in the radial direction, it becomes easy to reduce the size of the electric actuator 10 in the axial direction Z.

"The bearing holding section holds the first bearing" in the specification means that it is only necessary for the bearing holding section to be able to position the first bearing in the radial direction, and it is not necessary for the first bearing to be fixed to the bearing holding section. In the embodiment, the first bearing 44a is positioned in the radial direction by being fitted into the inner cylindrical section 23c. The first bearing 44a is not fixed to the inner cylindrical section 23c.

The top plate section 23d protrudes inward in the radial direction from the upper end of the inner cylindrical section 23c. The top plate section 23d has an annular shape about the central axis J1 and has a plate surface with a plate shape that is perpendicular to the axial direction Z. The upper end of the motor shaft 41 is caused to pass through the inner side of the top plate section 23d. The inner circumferential edge of the top plate section 23d is curved on the lower side. The top plate section 23d covers the upper side of the first bearing 44a.

A preload member 47 is arranged between the top plate section 23d and the first bearing 44a in the axial direction Z. That is, the electric actuator 10 includes a preload member 47. The preload member 47 is an annular wave washer extending in the circumferential direction. The preload member 47 is brought into contact with the lower surface of the top plate section 23d and the upper end of the outer wheel of the first bearing 44a. The preload member 47 applies a downward preload to the outer wheel of the first bearing 44a.

The arm section 25 extends on the outside of the motor shaft 41 in the radial direction from the bearing holding section 23. As illustrated in FIG. 4, the arm section 25 has a plate surface with a plate shape that is perpendicular to the axial direction Z. The arm section 25 has a rectangular shape when seen in the axial direction Z. The arm section 25 connects the bearing holding section 23 to the output shaft support section 24. In this manner, it is easy to minimize the sizes of the bearing holding section 23, the output shaft support section 24, and the other portions of the metal member 22 and to reduce the size of the metal member 22. Therefore, it is easy to save the manufacturing cost of the housing 11 and to reduce the weight of the housing 11.

The output shaft support section 24 is coupled to the outer end in the radial direction of the arm section 25. The output shaft support section 24 has an annular shape about the output central axis J3 and has a plate surface with a plate shape that is perpendicular to the axial direction Z. In this manner, according to the embodiment, it is possible to easily create the output shaft support section 24 and the arm section 25 by press-working such as punching or bending a plate member made of metal or the like since the output shaft support section 24 and the arm section 25 have plate shapes.

The metal member 22 in the embodiment is a single member that is created by press-working a plate ember made of metal.

The output shaft support section 24 has a through-hole 24a that penetrates through the output shaft support section 24 in the axial direction Z. As illustrated in FIG. 1, a fitting section 61c that is an upper end of the output shaft main body 61a is fitted into the through hole 24a. That is, the output shaft 61 has a fitting section 61c that is fitted into the through-hole 24a. In this manner, the output shaft support section 24 supports the output shaft 61.

In this manner, according to the embodiment, it is possible to hold the first bearing 44a with the metal member 22 made of metal and to support the output shaft 61. In this manner, it is possible to more precisely arrange the relative positions of the motor shaft 41 and the output shaft 61 supported with the first bearing 44a. In addition, since the housing main body 11a with which the metal member 22 is held is made of resin, it is possible to reduce the weight of the housing 11. As described above, according to the embodiment, it is possible to obtain the electric actuator 10 with a reduced weight and with a structure capable of preventing the precision of the relative positions of the motor shaft 41 and the output shaft 61 from being degraded. In Addition, the metal member 22 has higher strength and heat resistance as compared with resin since the metal member 22 is made of metal. Therefore, it is possible to prevent the metal member 22 from being significantly deformed and damaged and to prevent the motor shaft 41 and the output shaft 61 from deviating even in a case in which external force and heat are applied to the housing 11.

In addition, it is possible to easily cause the metal member 22 to support the output shaft 61 and to easily perform positioning by fitting the fitting section 61c into the through hole 24a according to the embodiment. Therefore, it is possible to easily assemble the electric actuator 10.

The motor case main body 31 has a motor accommodating section 32 and an output section holding section 33. The motor accommodating section 32 has a tubular shape that has a bottom section and opens upward. The motor accommodating section 32 has a cylindrical shape about the central axis J1. The motor accommodating section 32 accommodates the motor unit 40. That is, the motor case main body 31 accommodates the motor unit 40.

Note that "the motor case main body accommodates the motor unit" in the specification means that it is only necessary that a portion of the motor unit be accommodated in the motor case main body and the other portion of the motor unit may protrude to the outside of the motor case main body. In the embodiment, the motor case main body 31, that is, the motor accommodating section 32 accommodates the lower portion of the motor shaft 41, the rotor main body 42, the stator 43, and the second bearing 44b.

The output section holding section 33 protrudes outward in the radial direction from the motor accommodating section 32. The output section holding section 33 has a base section 33a and an output shaft holding section 33b. The base section 33a protrudes outward in the radial direction from the motor accommodating section 32. The output shaft holding section 33b protrudes on both sides in the axial direction from the outer end in the radial direction of the base section 33a. The output shaft holding section 33b has a cylindrical shape about the output central axis J3. The output shaft holding section 33b opens on both sides in the axial direction. The inside of the output shaft holding section 33b penetrates through the base section 33a in the axial direction.

A cylindrical bush 65 is fitted into the inside of the output shaft holding section 33b. A flange section that protrudes outward in the radial direction about the output central axis J3 is provided at the upper end of the bush 65. The flange section of the bush 65 is supported from the lower side with the upper end of the output shaft holding section 33b. A portion, which is lower than the flange section 61b, of the output shaft main body 61a is fitted into the inside of the bush 65. The bush 65 supports the output shaft 61 such that the output shaft 61 can rotate about the output central axis J3. The flange section 61b is supported from the lower side with the upper end of the output shaft holding section 33b via the flange section of the bush 65. The lower opening 61d of the output shaft 61 is arranged below the bush 65.

The stator fixing member 37 has a bottom section and has a tubular shape that opens upward. The stator fixing member 37 has a cylindrical shape about the central axis J1. The stator fixing member 37 is fitted into the inside of the motor accommodating section 32. A plurality of through-holes arranged in the circumferential surface are provided at the bottom section of the stator fixing member 37. A plurality of protruding sections provided at the bottom section of the motor accommodating section 32 are respectively fitted into the through-holes of the stator fixing member 37.

The upper end of the stator fixing member 37 protrudes above the motor accommodating section 32. The second bearing 44b is held at the bottom section of the stator fixing member 37. The outer circumferential surface of the stator 43 is fixed to the inner circumferential surface of the stator fixing member 37. The stator fixing member 37 is made of metal. The motor case 30 is created by insert molding in which resin is poured into a mold in a state in which the stator fixing member 37 is inserted into the mold, for example.

Figure 5:
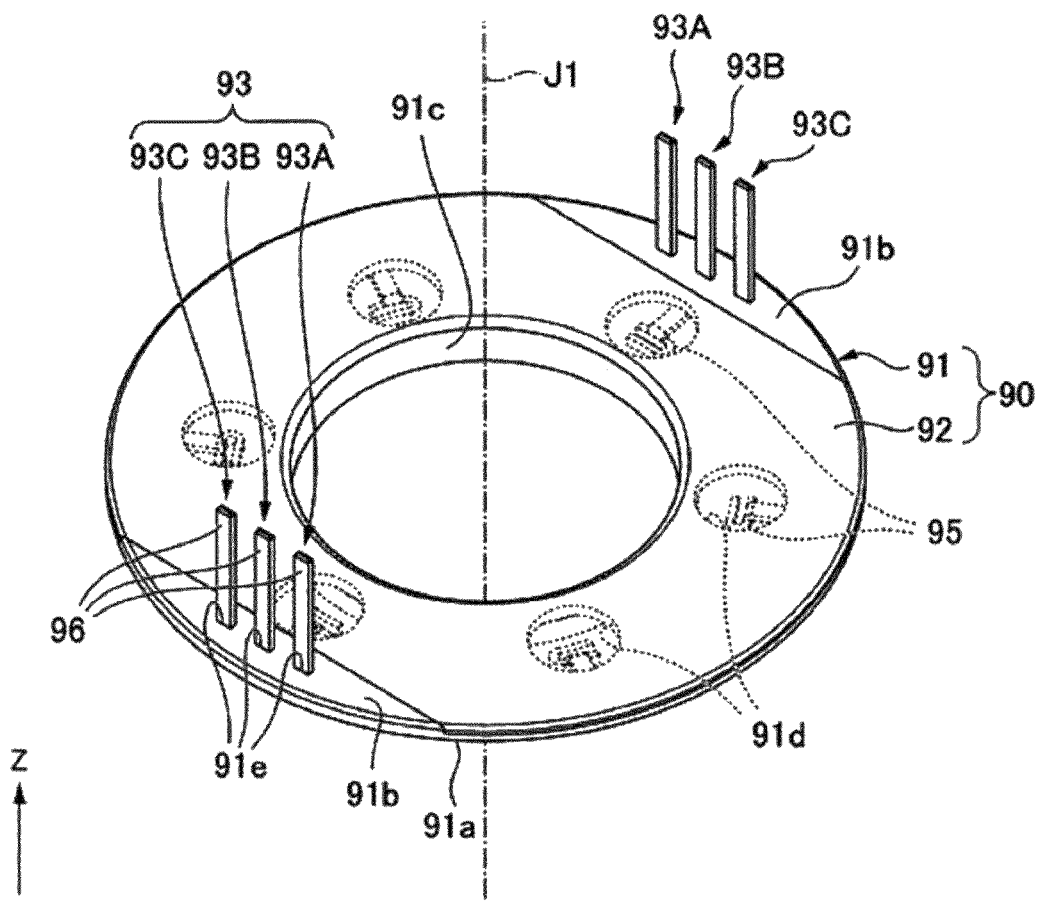
FIG. 5 is a perspective view illustrating a busbar holder and a busbar according to the embodiment.

The busbar holder 90 is arranged at the upper opening of the stator fixing member 37. As illustrated in FIG. 5, the busbar holder 90 has an annular shape about the central axis J1 and has a plate surface with a plate shape that is perpendicular to the axial direction Z. The busbar holder 90 holds the busbars 93. As illustrated in FIG. 2, the busbar holder 90 covers the upper side of the stator 43. The busbar holder 90 is made of resin. The busbar holder 90 has a support member 91 and a cap member 92. That is, the electric actuator 10 includes the support member 91 and the cap member 92.

The support member 91 is a member that supports the busbars 93. The support member 91 is arranged between the speed reducer 50 and the stator 43 in the axial direction Z. The support member 91 covers the upper side of the stator 43. Therefore, it is possible to prevent foreign matters such as an abrasive powder or the like generated from the speed reducer 50 from adhering to the stator 43 with the support member 91.

Figure 6:
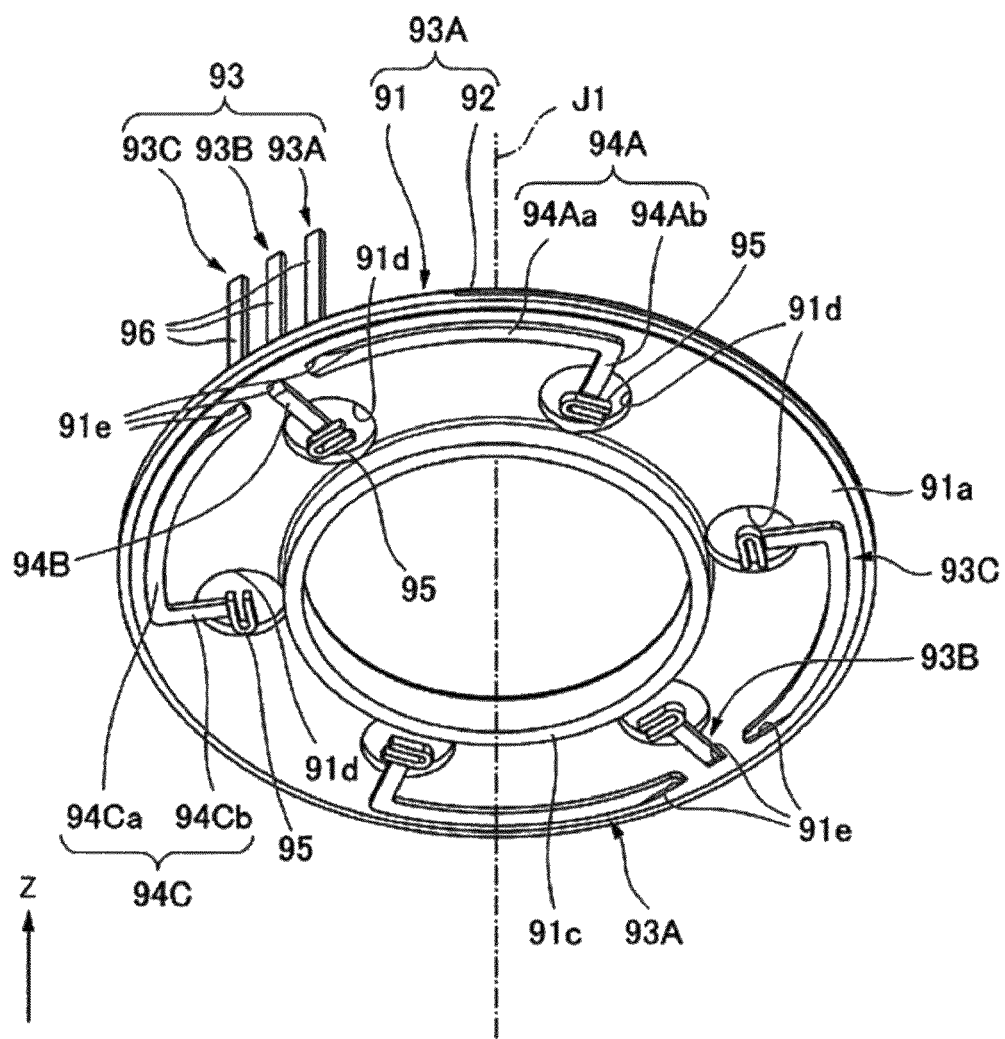
FIG. 6 is a perspective view illustrating the busbar holder and the busbar according to the embodiment.

As illustrated in FIGS. 5 and 6, the support member 91 has an annular plate section 91a and a cylindrical section 91c. The annular plate section 91a has an annular shape about the central axis J1 and has a plate surface with a plate shape that is perpendicular to the axial direction Z. As illustrated in FIGS. 2 and 6, a step difference that is recessed upward from the inner side in the radial direction to the outer side in the radial direction is provided at an outer circumferential edge of the lower surface of the annular plate section 91a in the radial direction. As illustrated in FIG. 2, the outer circumferential edge in the radial direction, which is recessed upward due to the step difference, of the lower surface of the annular plate section 91a is brought into contact with the upper end of the stator fixing member 37.

As illustrated in FIG. 5, the annular plate section 91a has a pair of plate thickness sections 91b at outer ends on both sides in the radial direction with the central axis J1 interposed therebetween in one radial direction. The plate thickness sections 91b are portions that have larger dimensions in the axial direction Z and protrude upward as compared with a portion other than the plate thickness sections 91b of the annular plate section 91a. The plate thickness sections 91b have a shape obtained by cutting a circular outer edge in the radial direction along a straight line that is perpendicular to the radial direction when seen in the axial direction Z. The pair of plate thickness sections 91b are arranged in mutual symmetry relative to the radial direction.

As illustrated in FIG. 6, the cylindrical section 91c has a tubular shape that protrudes downward from the inner circumferential edge of the annular plate section 91a in the radial direction. The cylindrical section 91c has a cylindrical shape about the central axis J1. As illustrated in FIG. 2, the lower end of the cylindrical section 91c is brought into contact with the upper end of the inner end of the insulator 43b in the radial direction. In this manner, the support member 91 is supported from the lower side with the stator fixing member 37 and the insulator 43b and is arranged on the upper side of the stator 43.

The support member 91 has support member through-holes 91d and support holes 91e that penetrate through the support member 91 in the axial direction Z. The support member through-holes 91d are provided at a portion, which is close to the inner side in the radial direction, of the annular plate section 91a. The support member through-holes 91d are arranged on the inner side beyond the plate thickness sections 91b in the radial direction. As illustrated in FIG. 5, the support member through-holes 91d have circular shapes when seen in the axial direction Z. A plurality of support member through-holes 91d are provided. The plurality of support member through-holes 91d are arranged at equal intervals all around the circumferential direction. In the embodiment, six support member through-holes 91d are provided, for example.

The support holes 91e are provided at the plate thickness sections 91b. The support holes 91e have rectangular shapes that are long in the circumferential direction when seen in the axial direction Z. A plurality of support holes 91e are provided. Among the support holes 91e in the embodiment, two support hole groups each including three support holes 91e aligned in the circumferential direction are provided with the central axis J1 interposed therebetween in the radial direction. That is, a total of six support holes 91e are provided. As illustrated in FIG. 2, the respective support holes 91e are arranged at positions at which the support holes 91e overlap the respective bottom wall through-holes 21e when seen in the axial direction Z.

As illustrated in FIG. 5, the cap member 92 has a substantially annular shape about the central axis J1 and has a plate surface with a plate shape that is perpendicular to the axial direction Z. The shape of the cap member 92 when seen in the axial direction Z is a shape obtained by cutting the outer circumferential edge on both sides in the radial direction with the central axis J1 interposed therebetween in the radial direction along a straight line that is perpendicular to the radial direction from a circular shape. The cap member 92 is attached to the upper side of the support member 91. The cap member 92 is arranged such that the cap member 92 is brought into contact with the upper surface, which is at a portion other than the plate thickness sections 91b, of the annular plate section 91a. The cap member 92 is arranged between the pair of plate thickness sections 91b. The upper surface of the cap member 92 and the upper surfaces of the pair of plate thickness sections 91b are arranged in the same plane that is perpendicular to the axial direction Z and are continuous with each other. An outer shape of an integrated portion of the cap member 92 and the pair of plate thickness sections 91b is a circular shape when seen in the axial direction Z.

As illustrated in FIG. 1, the support member 91 and the cap member 92 are fixed with the outer circumferential edge in the radial direction interposed with the bottom surface of the concave section 21c and the upper end of the stator fixing member 37 in the axial direction Z. As illustrated in FIGS. 2 and 5, the cap member 92 covers the support member through-holes 91d from the upper side. The cap member 92 blocks the upper openings of the plurality of support member through-holes 91d.

As illustrated in FIG. 2, each busbar 93 has a busbar main body section 94, a coil line connecting section 95, and a connection terminal section 96. The busbar main body section 94 extends along a plane that is perpendicular to the axial direction Z. The busbar main body section 94 has a plate surface with a plate shape that is perpendicular to the axial direction Z. The busbar main body section 94 is arranged on the lower side of the support member 91. The busbar main body section 94 is arranged such that the busbar main body section 94 faces the lower surface of the support member 91 via a slight gap. The busbar main body section 94 may be in contact with the lower surface of the support member 91. The busbar main body section 94 is arranged between the speed reducer 50 and the stator 43 in the axial direction Z.

The coil line connecting section 95 continues to one end of the busbar main body section 94, that is, an inner end in the radial direction in FIG. 2. As illustrated in FIG. 6, the coil line connecting section 95 has a U shape that opens on one side in the circumferential direction when seen in the axial direction Z. The coil line connecting section 95 overlaps the support member through-holes 91d when seen in the axial direction Z. As illustrated in FIG. 2, the coil line 43d is inserted into the U-shaped coil line connecting section 95. The coil line connecting section 95 is swaged in the radial direction and grips the coil line 43d inserted thereinto. The coil line connecting section 95 and the coil line 43d are fixed to each other by welding. In this manner, the coil line 43d that extends upward from the coil 43c is connected to the coil line connecting section 95.

Here, according to the embodiment, the support member through-holes 91d overlap with the coil line connecting section 95 when seen in the axial direction Z. Therefore, the coil line connecting section 95 is visible from the upper side of the support member 91 via the support member through-holes 91d in a state before the cap member 92 is attached to the support member 91. In this manner, it is possible to perform a task of connecting the coil line connecting section 95 to the coil line 43d from the upper side of the support member 91 in a state in which the support member 91 is arranged on the upper side of the stator 43. Therefore, it is possible to easily connect the coil line connecting section 95 to the coil line 43d.

Also, according to the embodiment, the cap member 92 covers the support member through-holes 91d and the coil line connecting section 95 from the upper side. Therefore, it is possible to block the support member through-holes 91d with the cap member 92 from the upper side by attaching the cap member 92 to the support member 91 after connecting the coil line connecting section 95 to the coil line 43d. In this manner, it is possible to prevent foreign matters such as abrasive powder generated from the speed reducer 50 from entering the lower side of the support member 91 via the support member through-holes 91*d*. Therefore, it is possible to prevent the foreign matters from adhering to the stator 43.

As illustrated in FIG. 2, the connection terminal section 96 continues to the other end of the busbar main body section 94, that is, the outer end in the radial direction in FIG. 2. The connection terminal section 96 extends upward from the busbar main body section 94 on the outer side beyond the speed reducer 50 in the radial direction. The connection terminal section 96 has a straight line shape that extends parallel to the axial direction Z and has a plate surface with a plate surface that is perpendicular to the radial direction. The connection terminal section 96 extends from the lower side to the upper side of the bottom wall 21*a* via the support holes 91*e* and the bottom wall through-hole 21*e* and is connected to the circuit board 70. In this manner, the coil line 43*d* and the circuit board 70 are electrically connected via the busbars 93. That is, the busbars 93 electrically connects the stator 43 to the circuit board 70.

According to the embodiment, it is possible to cause the connection terminal section 96 to protrude to the inner portion of the circuit board case 20 in a state in which the connection terminal section 96 is positioned in the direction that is perpendicular to the axial direction Z by causing the connection terminal section 96 to pass from the lower side through the bottom wall through-hole 21*e* that is positioned on the outer side beyond the speed reducer 50 in the radial direction. In this manner, it is possible to easily connect the connection terminal section 96 to the circuit board 70. Therefore, according to the embodiment, the electric actuator 10, in which the speed reducer 50 is arranged between the stator 43 and the circuit board 70 in the axial direction Z, which has a structure with which it is easy to connect the stator 43 to the circuit board 70, is obtained.

In addition, according to the embodiment, it is possible to stabilize the position of the connection terminal section 96, to make it easy to cause the connection terminal section 96 to pass through the bottom wall through-hole 21*e*, and to make it easy to connect the connection terminal section 96 to the circuit board 70 since the support member 91 that supports the busbars 93 is provided. In this manner, it is possible to make it easier to connect the stator 43 to the circuit board 70.

In addition, according to the embodiment, the connection terminal section 96 extends form the lower surface of the support member 91 to the upper side of the support member 91 via the support holes 91*e*. Therefore, it is possible to support the connection terminal section 96 with the support holes 91*e* and to further stabilize the position of the connection terminal section 96. Therefore, it is possible to make it easier to cause the connection terminal section 96 to pass through the bottom wall through-hole 21*e* and to make it easier to connect the connection terminal section 96 to the circuit board 70. Therefore, it is possible to make it easier to connect the stator 43 to the circuit board 70. In the embodiment, the connection terminal section 96 is press-fitted into and held at the support holes 91*e*.

In the embodiment, the connection terminal section 96 is caused to pass through the circuit board through-hole 70*b* and is connected to the circuit board 70. Therefore, it is possible to insert the connection terminal section 96 to the circuit board through-hole 70*b* by causing the connection terminal section 96 to pass through the bottom wall through-hole 21*e* from the lower side and by further inserting the connection terminal section 96 as it is. Therefore, it is possible to make it easy to perform the operation of connecting the connection terminal section 96 to the circuit board 70, and the stator 43 and the circuit board 70 are further easily connected. The upper end of the connection terminal section 96 protrudes above the circuit board 70 via the circuit board through-hole 70*b*. Although not illustrated in the drawing, the upper end of the connection terminal section 96 that is caused to pass through the circuit board through-hole 70*b* is fixed to the circuit board 70 by welding, for example, in the embodiment.

As illustrated in FIGS. 5 and 6, a plurality of busbars 93 are provided. In the embodiment, two busbar groups, each of which includes busbars 93A, 93B, and 93C, are provided with the central axis J1 interposed therebetween in the radial direction. That is, a total of six busbars 93 are provided in the embodiment. In each busbar group, the connection terminal section 96 of the busbar 93A, the connection terminal section 96 of the busbar 93B, and the connection terminal section 96 of the busbar 93C are aligned in this order and are arranged in the circumferential direction.

As illustrated in FIG. 6, a busbar main body section 94A of the busbar 93A from among the busbar main body sections 94 of the respective busbars 93 has a circumferential direction extending section 94Aa and a radial direction extending section 94Ab. The circumferential direction extending section 94Aa extends on one side in the circumferential direction from the lower end of the busbar 93A at the connection terminal section 96. The radial direction extending section 94Ab extends inward in the radial direction from an end on one side of the circumferential direction extending section 94Aa in the circumferential direction. An inner end of the radial direction extending section 94Ab in the radial direction overlaps with the support member through-hole 91*d* when seen in the axial direction. The coil line connecting section 95 continues to the inner end of the radial direction extending section 94Ab in the radial direction.

A busbar main body section 94B of the busbar 93B from among the busbar main body sections 94 of the respective busbars 93 extends inward in the radial direction from the lower end of the busbar 93B at the connection terminal section 96. The inner end of the busbar main body section 94B in the radial direction overlaps with the support member through-hole 91*d* when seen in the axial direction Z. The coil line connecting section 95 continues to the inner end of the busbar main body section 94B in the radial direction.

A busbar main body section 94C of the busbar 93C from among the busbar main body sections 94 of the respective busbars 93 has a circumferential direction extending section 94Ca and a radial direction extending section 94Cb. The circumferential direction extending section 94Ca extends on the other side in the circumferential direction from the lower end of the busbar 93C at the connection terminal section 96. The radial direction extending section 94Cb extends inward in the radial direction from the end of the circumferential direction extending section 94Ca on the other side in the circumferential direction. The inner end of the radial direction extending section 94Cb in the radial direction overlaps with the support member through-hole 91*d* when seen in the axial direction Z. The coil line connecting section 95 continues to the inner end of the radial direction extending section 94Cb in the radial direction.

The disclosure is not limited to the aforementioned embodiment, and other configurations can also be employed. The shape of the circuit board case is not particularly limited as long as the circuit board case has a bottom wall and accommodates the circuit board above the bottom wall. The circuit board case may be a single member with no metal member.

The circuit board may not have the circuit board through-holes. In this case, the connection terminal section is in contact with and fixed to the plate surface of the circuit board, for example. The support member is not particularly limited as long as the support member can support the busbars. The support member may hold the busbars on the upper surface of the support member. The support member may be created by insert molding in which resin is poured into a mold into which the bur bars are inserted. The support member may not be provided. The cap member may not be provided. The busbars are not particularly limited as long as the busbars have the busbar main body sections, the coil line connecting sections, and the connection terminal sections. The number of busbars is not particularly limited.

The first bearing, the second bearing, the third bearing, and the fourth bearing may not be ball bearings and may be sliding bearings or the like. The configuration of the speed reducer is not particularly limited. The direction in which the output shaft extends may be different from the direction in which the motor shaft extends.

Purposes of the electric actuator according to the aforementioned embodiment are not particularly limited, and the electric actuator may be mounted on devices other than a vehicle. Also, the aforementioned respective configurations can appropriately be combined without conflicting with each other.

Features of the above-described embodiments and the modifications thereof may be combined appropriately as long as no conflict arises.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electric actuator, comprising:
    a motor unit that has a motor shaft extending in an axial direction and a stator arranged on an outer side in a radial direction of the motor shaft;
    a speed reducer that is arranged on one side of the stator in the axial direction and is coupled to one side of the motor shaft in the axial direction;
    a circuit board that is arranged on one side of the speed reducer in the axial direction;
    a busbar that electrically connects the stator to the circuit board;
    an output section that has an output shaft to which rotation of the motor shaft is delivered via the speed reducer; and
    a housing that accommodates the motor unit, the speed reducer, the circuit board, the busbar, and the output section,
    wherein the housing has:
        a motor case that opens on one side in the axial direction; and
        a circuit board case that is attached to one side of the motor case in the axial direction,
    the circuit board case has a bottom wall that blocks an opening of the motor case and accommodates the circuit board on one side beyond the bottom wall in the axial direction,
    the bottom wall has a bottom wall through-hole that penetrates through the bottom wall in the axial direction on the outer side beyond the speed reducer in the radial direction,
    the stator has a plurality of coils,
    the busbar has:
        a busbar main body section that is arranged between the speed reducer and the stator in the axial direction and extends along a plane that is perpendicular to the axial direction,
        a coil line connecting section, which continues to the busbar main body section, to which a coil line extending on one side in the axial direction from the coil is connected, and
        a connection terminal section that extends on one side in the axial direction from the busbar main body section on the outer side beyond the speed reducer in the radial direction, and
    the connection terminal section extends on one side in the axial direction from the other side of the bottom wall in the axial direction via the bottom wall through-hole and is connected to the circuit board.

2. The electric actuator according to claim 1, wherein
    the circuit board has a circuit board through-hole that penetrates through the circuit board in the axial direction, and
    the connection terminal section passes through the circuit board through-hole and is connected to the circuit board.

3. The electric actuator according to claim 1, further comprising:
    a support member that is arranged between the speed reducer and the stator in the axial direction and supports the busbar.

4. The electric actuator according to claim 2, further comprising:
    a support member that is arranged between the speed reducer and the stator in the axial direction and supports the busbar.

5. The electric actuator according to claim 3, wherein
    the support member has a support hole that penetrates through the support member in the axial direction,
    the busbar main body section is arranged on the other side of the support member in the axial direction, and
    the connection terminal section extends on one side of the support member in the axial direction via the support hole from a surface on the other side of the axial direction of the support member.

6. The electric actuator according to claim 4, wherein
    the support member has a support hole that penetrates through the support member in the axial direction,
    the busbar main body section is arranged on the other side of the support member in the axial direction, and
    the connection terminal section extends on one side of the support member in the axial direction via the support hole from a surface on the other side of the axial direction of the support member.

7. The electric actuator according to claim 3, wherein
    the speed reducer is held at a surface on the other side of the bottom wall in the axial direction, and
    the support member covers one side of the stator in the axial direction.

8. The electric actuator according to claim 4, wherein
    the speed reducer is held at a surface of the bottom wall on the other side in the axial direction, and
    the support member covers one side of the stator in the axial direction.

9. The electric actuator according to claim 7, further comprising:
- a cap member that is attached to one side of the support member in the axial direction,
- wherein the support member has a support member through-hole that penetrates through the support member in the axial direction,
- the support member through-hole overlaps the coil line connecting section when seen in the axial direction, and
- the cap member covers the support member through-hole and the coil line connecting section from one side in the axial direction.

10. The electric actuator according to claim 8, further comprising:
- a cap member that is attached to one side of the support member in the axial direction,
- wherein the support member has a support member through-hole that penetrates through the support member in the axial direction,
- the support member through-hole overlaps the coil line connecting section when seen in the axial direction, and
- the cap member covers the support member through-hole and the coil line connecting section from one side in the axial direction.

* * * * *